May 1, 1962 H. H. WIEDER 3,032,706

FOUR TERMINAL FERROELECTRIC CRYSTALS

Filed March 18, 1959

INVENTOR.
HERMAN HARRY WIEDER
BY
Q. Baxter Warner
V. C. Muller
ATTORNEYS

United States Patent Office 3,032,706

Patented May 1, 1962

3,032,706

FOUR TERMINAL FERROELECTRIC CRYSTALS

Herman H. Wieder, Riverside, Calif., assignor to the United States of America as represented by the Secretary of the Navy Filed Mar. 18, 1959, Ser. No. 800,349

4 Claims. (Cl. 323—94)

(Granted under Title 35, U.S. Code (1952), sec. 266)

The invention described herein may be manufactured and used by or for the Government of the United States of America for governmental purposes without the payment of any royalties thereon or therefor.

This invention relates to ferroelectric crystals and more particularly to the utilization of the anisotropy of ferroelectric crystals and the inter-action of polarization along particular ferroelectric axes whereby the crystals may be utilized as four terminal elements in electrical and electronic circuits to provide improved impedance transformers, amplifiers, ferroelectric memories and other similar circuits.

Previous methods of employing ferroelectric crystals depend upon their utilization as non-linear devices and the bi-stability characteristics of the ferroelectric hysteresis loop.

In one preferred embodiment of the present invention a ferroelectric crystal such as barium titanate in the orthorhombic phase is cut so that its *a*-axis is oriented perpendicularly to the major crystal surface. Gold electrodes are evaporated or otherwise formed on the four faces perpendicular to the *a*-axis and the *c*-axis respectively for connection in suitable electrical or electronic circuits.

A low impedance path is thus provided along the *a*-axis and a high impedance path along the *c*-axis so that the two circuits are coupled by the inter-action of the *c*-circuit upon the *a*-circuit. A low power high potential signal applied to the *c*-circuit will therefore cause the modulation of the high powered low voltage output of alternating current in the *a*-circuit. This in effect, comprises an impedance transformer with the output circuit isolated from the input circuit except for the electric coupling between the two polarization axes. Upon the application of the signal over the high impedance portion of the circuit through the *c*-axis, a large amount of power flowing through the *a*-axis may be controlled, thus forming a dielectric power amplifier. The four terminal orthorhombic crystal may also be utilized in a ferroelectric memory matrix and in other circuits which are analogous to other magnetic circuits presently utilized.

One object of the present invention is to provide an effective means of impedance transformation utilizing a ferroelectric crystal wherein the input is isolated from the output circuit.

Another object of the present invention is to provide lower hysteresis and relaxation losses by utilizing the orthorhombic phase of a ferroelectric crystal for amplifiers, memory devices, saturable capacitors, modulators and other devices which may be operated at higher frequencies and achieve greater power handling ability.

Other objects and many of the attendant advantages of this invention will be readily appreciated as the same becomes better understood by reference to the following detailed description when considered in connection with the accompanying drawings wherein.

Figure 1:
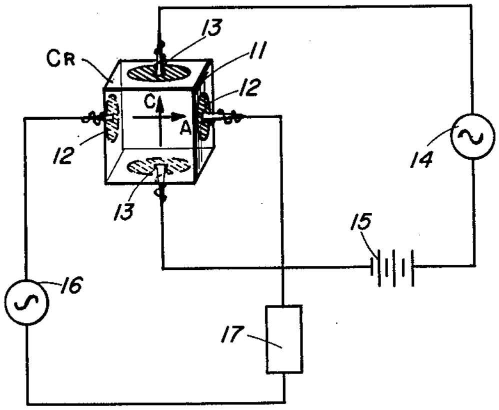
FIG. 1 is a schematic circuit diagram illustrating one preferred embodiment of the present invention wherein a ferroelectric crystal in the orthorhombic phase is utilized in a crossed field ferroelectric amplifier.

Referring now to the drawings in detail, a crossed field ferroelectric amplifier is illustrated in FIG. 1 utilizing a crystal such as barium titanate or potassium niobate in the orthorhombic phase. The crystal 11 cut from the parent orthorhombic phase crystal is cut with its faces perpendicular to the *a*-axis and the *c*-axis respectively as illustrated by the arrows in FIG. 1. The faces perpendicular to the *c*-axis and the *a*-axis are preferably provided with evaporated gold electrodes 12 and 13 respectively.

The electrodes 13 on the faces perpendicular to the *c*-axis are connected to a signal source 14 and to a bias such as the battery 15. The electrodes 12 on the faces perpendicular to the *a*-axis are connected to a power source such as the generator 16 and through the load 17. Upon the application of a signal over the high impedance portion of the circuit through the *c*-axis a large amount of power flowing through the *a*-axis may be controlled.

Figure 3:
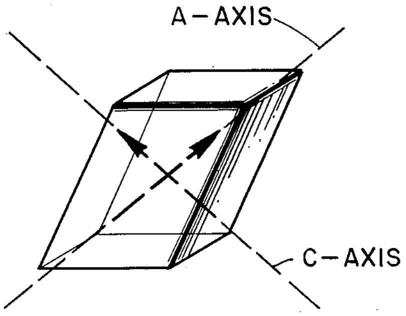
FIG. 3 is a molecular model of an orthorhombic crystal with the corresponding axial orientations of the *a*-axis and the *c*-axis.
Figure 4:
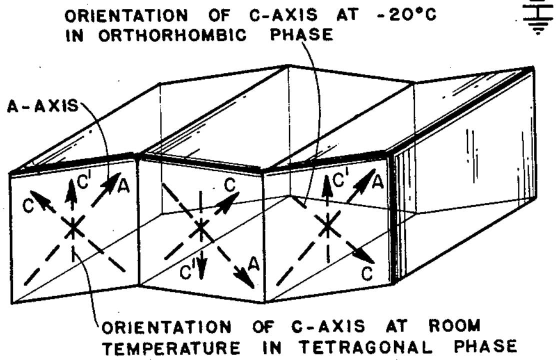
FIG. 4 is a molecular model illustrating the displacement of ferroelectric and crystallographic axes of a barium titanate crystal as the crystal undergoes a phase transition from tetragonal to the orthorhombic phase.

Experiments have indicated that a barium titanate single crystal which at room temperature has its *c*-axis oriented perpendicularly to the major crystal surface will, upon transition into the orthorhombic crystal phase, exhibit an interaction of the polarizations developed along the *a*-axis and the *c*-axis of the crystal. A molecular model of an orthorhombic crystal with the corresponding axial orientations is shown in FIG. 3 and the molecular model in FIG. 4 illustrates the displacement of the ferroelectric and crystallographic axes of the barium titanate crystal as the crystal undergoes the phase transition from the tetragonal to the orthorhombic phase with the shift of the *c*-axis from its position illustrated at room temperature to the position or orientation at −20° C. in the orthorhombic phase which is perpendicular to the *a*-axis. The crystals utilized in the circuits of FIG. 1 and FIG. 2 have been cut so that their faces are perpendicular to the *c*-axis and the *a*-axis respectively.

It is known that the dielectric constants along the *a*-axis and the *c*-axis of a barium titanate crystal at −20° C. are in the ratio of 3 to 1. Therefore for a crystal cut with the faces perpendicular to the *a* and *c*-axis respectively, one has in effect a low impedance path along the *a*-axis and a high impedance path along the *c*-axis, the two circuits being coupled by the interaction of the *c*-circuit upon the *a*-circuit. A low-power high-potential signal applied to the *c*-circuit will therefore cause the modulation of the high-power low-voltage output alternating current in the *a*-circuit. This in effect comprises an impedance transformer with the output circuit isolated from the input circuit except for the electric coupling between the two polarization axes. Due to inherent nonlinearity of a ferroelectric capacitor, this also comprises a dielectric power amplifier such as that illustrated in FIG. 1.

Figure 2:
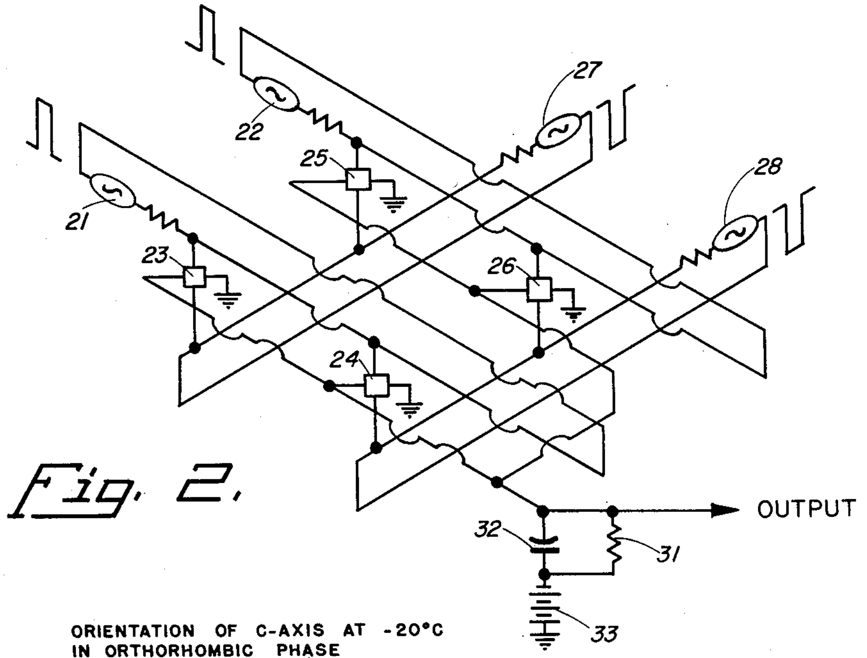
FIG. 2 is a schematic circuit diagram illustrating another embodiment of the present invention wherein a ferroelectric crystal in the orthorhombic phase is utilized in a crossed field two by two memory matrix.

A further example of the utilization of such a crystal is illustrated in the two by two ferroelectric memory matrix illustrated in FIG. 2 which also employs the four terminal orthorhombic crystal. In this circuit generators 21 and 22 are connected to one terminal of each of the crystals 23, 24 and 25, 26 respectively to apply the positive pulse thereto and the generators 27 and 28 are connected to the opposite terminals to apply a negative square pulse thereto. The opposite terminals of the crystals 23, 24, 25 and 26 are connected between ground and a load circuit consisting of the resistance 31, a condenser 32 and a bias battery 33 to provide an output when coincident pulses are applied to the crystals in the well known manner of analogous memory circuits utilizing magnetic memories.

It will be apparent that the ferroelectric crystal of the present invention in the orthorhombic phase may be utilized as a four terminal element in many electrical and electronic circuits other than those specifically disclosed herein.

Obviously many modifications and variations of the present invention are possible in the light of the above teachings. It is therefore to be understood that within the scope of the appended claims the invention may be practiced otherwise than as specifically described.

What is claimed is:

1. A ferroelectric polarization transformer comprising a ferroelectric single crystal in the orthohombic phase, said crystal being cut from a parent orthorhombic phase crystal and having two opposed faces cut perpendicular to the *a*-axis and two opposed faces cut perpendicular to the *c*-axis thereof.

2. A ferroelectric impedance transformer comprising a ferroelectric single crystal in the orthorhombic phase, said crystal being cut from a parent orthorhombic phase crystal and having two opposed faces cut perpendicular to the *a*-axis and two opposed faces cut perpendicular to the *c*-axis and an electrode formed on each of said faces for connection in electrical circuits.

3. A ferroelectric impedance transformer comprising a ferroelectric single crystal in the orthorhombic phase, said crystal being cut from a parent orthorhombic phase crystal and having two opposed faces cut perpendicular to the *a*-axis and two opposed faces cut perpendicular to the

*c*-axis and an electrode formed on each of said faces for connection in electrical circuits, a signal source and bias means connected across said electrodes on the faces perpendicular to the *c*-axis and a generator and load connected across said electrodes on the faces perpendicular to the *a*-axis.

4. A ferroelectric impedance transformer comprising a ferroelectric single crystal in the orthorhombic phase, said crystal being cut from a parent orthorhombic phase crystal and having two opposed faces cut perpendicular to the *a*-axis and two opposed faces cut perpendicular to the *c*-axis and an electrode formed on each of said faces for connection in electrical circuits, a pulse generator connected to each of said electrodes on the faces perpendicular to the *c*-axis, and a bias voltage source and load connected across said electrodes on the faces perpendicular to the *a*-axis.

References Cited in the file of this patent

UNITED STATES PATENTS

| | | |
|---|---|---|
| 1,919,053 | Brinton | July 18, 1933 |
| 2,680,720 | Jaffe | June 8, 1954 |
| 2,791,760 | Ross | May 7, 1957 |
| 2,830,274 | Rosen et al. | Apr. 8, 1958 |
| 2,871,192 | Augustine et al. | Jan. 20, 1959 |

OTHER REFERENCES

Proceedings of the IRE, "Some Aspects of Ferroelectricity" by G. Shirane et al., December 1955, pages 1738–1793.